Oct. 15, 1946.   A. A. HUMAN   2,409,355
AIRPLANE TIRE
Filed May 28, 1943

INVENTOR.
ALFRED A. HUMAN
BY Alexander Riaboff
HIS ATTORNEY

Patented Oct. 15, 1946

2,409,355

UNITED STATES PATENT OFFICE 2,409,355

AIRPLANE TIRE

Alfred A. Human, Sacramento, Calif.

Application May 28, 1943, Serial No. 488,927

3 Claims. (Cl. 244—103)

This invention relates to an airplane tire. When an airplane lands, its motionless wheels touch the ground at a speed varying from 40 miles per hour and up depending upon the type of a plane. In a moment after the wheels have touched the ground they must attain peripheral speed equal to the landing speed of the plane. The wheels of big multimotor planes weigh many hundreds of pounds each and possess tremendous inertia. That inertia must be overcome, and the peripheral speed of the wheel attained, in a fraction of a second. Hence a tremendous force is applied to the tire at the point and at the moment it touches the ground, which is felt all over the plane even in the best landing and causes undue wear of the tire at the point which meets the ground.

In small planes the wheels are usually stationary, and remain motionless during the flight. Usually the wheel occupies the same position in each flight, which position is determined by location of the air valve, the latter occupying the lowermost position during each flight. Therefore, the tire will hit the ground with the same spot with each landing and said spot on the tire wears out in a short time while the rest of the tire may still be in good condition.

The purpose of this invention is to provide a new airplane tire which will permit a smoother landing and will have a longer life.

Another object of this invention is to provide an airplane tire which is adapted to rotate the wheel when exposed to an air stream.

Another object of this invention is to provide an airplane tire which will rotate in the same direction in which the tires of an airplane rotate after they touch the ground during the landing.

Another object of this invention is to overcome the inertia of an airplane tire and to eliminate an undue wear thereof during each landing operation by rotating said wheels preparatory to said landing.

Still another object of this invention is to provide means for preventing rotation of an airplane wheel during a flight but for permitting the same, when a plane is about to land.

Other objects and advantages will appear as the specification proceeds and the novel features of the device will be particularly pointed out in the claims hereto annexed.

In this specification and the annexed drawing, the invention is illustrated in the form considered to be the best, but it is to be understood, that the invention is not limited to such form; and it is also to be understood that in and by the claims following the description, it is desired to cover the invention in whatsoever form it may be embodied.

Figure 1:
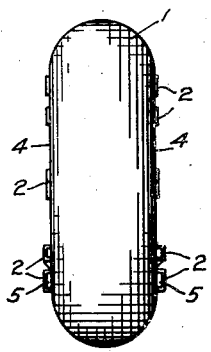
Fig. 1 is a front view of an airplane tire having air pockets on both sides thereof.
Figure 2:
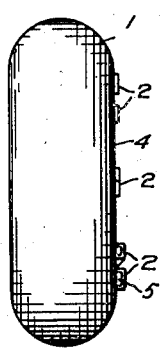
Fig. 2 is a front view of an airplane tire having air pockets on one side thereof only.
Figure 3:
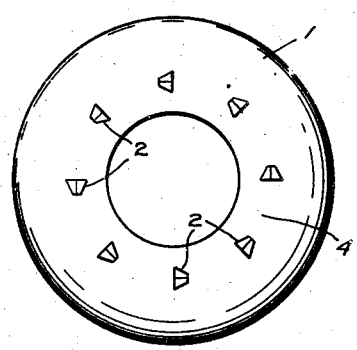
Fig. 3 is a side view of a tire shown in Figs. 1 and 2.

In general, my invention consists in providing means on an airplane tire for rotating same by an air stream in the same direction in which a tire shall rotate after it hits the ground during landing operation. Any means may be employed for that purpose. It may consist of an arrangement of grooves and protuberances on the working surface of a tire, or on the sides of a tire, and may be of any shape and size, but sufficient to rotate an airplane wheel at a peripheral speed somewhat slower than the landing speed of a given plane.

If an airplane has a landing gear retractable into an under surface of a wing, it is preferable that the means for rotating a wheel be arranged only on one side of a tire, which faces the wing when retracted, so as not to be exposed to the air stream, by reason of which the wheel shall remain stationary as long as the landing gear is in retracted position. But when the landing gear is dropped down before landing, the whole wheel is exposed to the air stream, and it starts to rotate.

In case of a stationary landing gear, the wheels, or at least a portion thereof, are constantly disposed to the air stream, and therefore will rotate all the time during a flight. Means may be arranged in connection with a stationary landing gear to prevent such rotation which means may be releasable by an operator before a landing.

In detail, in carrying out my invention I make use of an airplane tire 1 which may be of any size and shape, on the sides of which I provide means for rotating a wheel carrying said tire when the same is exposed to an air stream. Said means may be of various shapes and sizes and for the purpose of illustration is shown in the drawing in a form of a plurality of air pockets 2. Each air pocket 2 is made in form of a truncated pyramid, in which one of the sides is cut off and substituted by the side 4 of said tire. The pocket 2, has a wide front opening 5 formed by the side 4 of the tire 1, outer wall 6 and sides 7 and 8. A comparatively narrow rear opening 10 is defined by the same elements.

The sides 7 and 8 are adapted to fold inwardly along a crease or fold 11. The outer wall is preferably reenforced by a central rib 13 and a rib 15 on the rim of said front opening.

The air pockets 2 may be made separately and then vulcanized or otherwise secured to the side of a tire, or a tire may be molded with the pockets 2 in place. The pockets 2 are equally spaced on the side of a tire and are arranged in such a manner that the front openings 5 coincide with the radii drawn from the center of a wheel and face the air stream when they are in the lowermost position, so as to rotate the wheel in the same direction in which it rotates after it touches the ground in a landing operation. In its lowermost position, the pockets 2 face the air stream with its wide front opening 5 open whereby the wheel is forced to rotate. When said pockets reach about half way between the lowermost and uppermost positions on the tire they fold under the action of the air stream and remain closed until they reach a position slightly below the half way between said positions when they open again. The rear opening 10 is provided for the purpose of keeping the pocket 2 clean of any foreign matter which may get into it.

Figure 6:
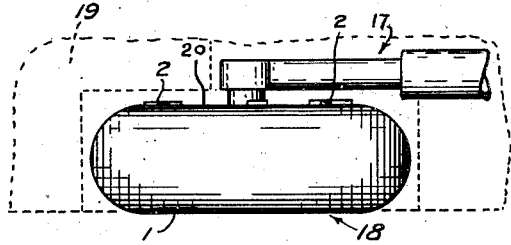
Fig. 6 is a diagrammatic view of a retractable landing gear in a retracted position.
Figure 7:
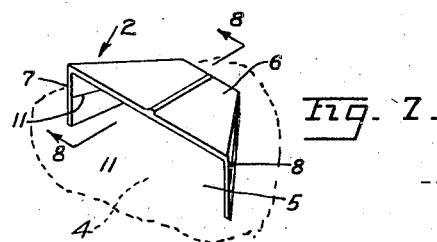
Fig. 7 is a perspective view of an air pocket.
Figure 9:
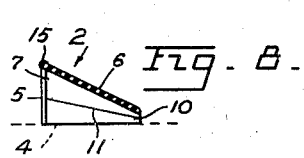
Fig. 9 is a front elevation of an air pocket in folded position.
Figure 8:
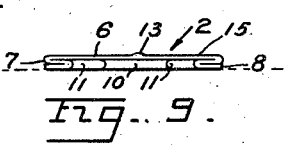
Fig. 8 is a cross-section taken along line 8—8 of the Fig. 7.

The air pockets 2 may be arranged on both sides of a tire or on one side thereof. For a retractable landing gear 17 as shown in Fig. 6 the wheels 18 of which retract inside of a wing 19, it is advisable to have the air pockets only on the side 20 which is hidden from the air stream when the wheel is retracted.

In this case, when the landing gear is dropped down before landing the air pockets being exposed to the air stream start to rotate the wheels immediately, which will attain sufficient speed to provide a smooth landing.

In case of a stationary landing gear it is preferable to arrange the air pockets 2 on both sides of a tire. Usually a cowling 25 is provided to cover the upper portion of a wheel 26 for better streamlining and the lower portion of the same is disposed to the air stream.

Means may be provided for covering and pressing the air pockets 2 against the sides of the tire for the purpose of eliminating air resistance created by said pockets and for preventing rotation of the wheel 26 during a flight. The last mentioned means may be of various designs, and in Figs. 4 and 5 I have shown the same as consisting of a cover 27 in form of a segment, hinged to the cowling 25 at 28 on both sides of the wheel. The cover 27 is large enough to cover the air pockets located on the lower portion of the tire.

Figure 4:
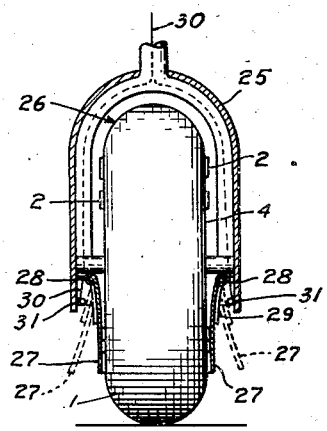
Fig. 4 is a vertical cross-section of an airplane landing gear taken along line 4—4 of the Fig. 5, showing the tire in elevation and a mechanism for keeping air pockets closed.
Figure 5:
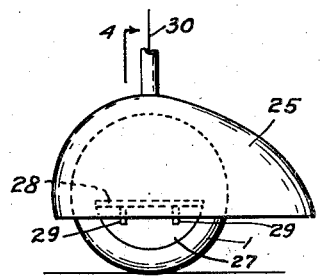
Fig. 5 is a side view of the Fig. 4, drawn on a smaller scale.

A spring 29 presses the cover 27 against the side of the tire 1, and thereby forces the air pockets to fold and completely cover the same. A cable 30 is connected to the cover 27 which cable passes around a pulley 31 and up into a fuselage, not shown. By means of the cable 30 the cover 27 may be opened as shown in Fig. 4 in dotted lines, thus permititng the air pockets 2 to open and cause the wheel to rotate.

Having thus described my invention, I claim:

1. In an airplane wheel, an airplane tire having a plurality of foldable air pockets on the side thereof, adapted to rotate the wheel when the same is exposed to an air stream, means adapted to collapse said pockets and thereby to prevent rotation of said wheel and means for operating the first mentioned means.

2. A combination of an airplane landing gear including a wheel having a tire with plurality of foldable air pockets on the side thereof adapted to rotate the wheel when the same is exposed to an air stream, with means carried by said landing gear adapted to collapse said pockets.

3. A combination of an airplane wheel having a tire with plurality of foldable air pockets on the side thereof, with a cowling covering the upper portion of the wheel, and means carried by said cowling for collapsing said pockets.

ALFRED A. HUMAN.